United States Patent
Kim (10) Patent No.: US 8,698,458 B2
(45) Date of Patent: Apr. 15, 2014

(54) BATTERY PACK HAVING BOOSTING CHARGE FUNCTION AND METHOD THEREOF

(75) Inventor: Youngu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 227 days.

(21) Appl. No.: 12/986,139

(22) Filed: Jan. 6, 2011

(65) Prior Publication Data

US 2012/0007547 A1   Jan. 12, 2012

Related U.S. Application Data (60) Provisional application No. 61/362,543, filed on Jul. 8, 2010.

(51) Int. Cl.
*H02J 7/00* (2006.01)

(52) U.S. Cl.
USPC ........... 320/134; 320/143; 320/161; 320/162; 320/163; 320/164

(58) Field of Classification Search
USPC .................. 320/143, 150–151, 161–164, 134
See application file for complete search history.

(56) References Cited

U.S. PATENT DOCUMENTS

| | | | |
|---|---|---|---|
| 3,963,976 A | 6/1976 | Clark | |
| 4,061,956 A | 12/1977 | Brown et al. | |
| 4,390,828 A * | 6/1983 | Converse et al. | 320/153 |
| 5,617,007 A | 4/1997 | Keidl et al. | |
| 5,637,979 A | 6/1997 | Tamai et al. | |
| 5,736,832 A * | 4/1998 | Seragnoli | 320/128 |
| 5,909,103 A * | 6/1999 | Williams | 320/134 |
| 6,337,563 B2 * | 1/2002 | Takimoto et al. | 323/284 |
| 6,522,102 B1 | 2/2003 | Cheiky et al. | |
| 6,771,050 B2 * | 8/2004 | Yamashita | 320/150 |
| 2002/0167295 A1 | 11/2002 | Yamashita | |
| 2004/0195996 A1 | 10/2004 | Nishida | |
| 2005/0007075 A1 | 1/2005 | Woo et al. | |
| 2005/0134231 A1 | 6/2005 | Cho | |
| 2005/0194938 A1 | 9/2005 | Sanpei | |
| 2006/0192531 A1 * | 8/2006 | Nishida | 320/128 |

(Continued)

FOREIGN PATENT DOCUMENTS

| | | |
|---|---|---|
| CN | 2032371 U | 2/1989 |
| CN | 2559875 Y | 7/2003 |

(Continued)

OTHER PUBLICATIONS

KIPO Office action dated Mar. 9, 2012, for corresponding Korean Patent application 10-2011-0008865, 4 pages.

(Continued)

*Primary Examiner* — Samuel Berhanu
(74) *Attorney, Agent, or Firm* — Christie, Parker & Hale, LLP (57) ABSTRACT

A method of charging a battery pack, the battery pack including at least one battery cell. The method includes comparing a battery cell voltage to a first voltage; comparing the battery cell voltage to a second voltage that is greater than the first voltage; and controlling a current amplifying unit coupled to the at least one battery cell to amplify a current from a charger to the at least one battery cell if the battery cell voltage is between the first voltage and the second voltage.

18 Claims, 7 Drawing Sheets

(56) References Cited

U.S. PATENT DOCUMENTS

| | | |
|---|---|---|
| 2008/0258689 A1 | 10/2008 | Antheunis et al. |
| 2009/0146613 A1 | 6/2009 | Yang |
| 2012/0306453 A1 | 12/2012 | Yang |

FOREIGN PATENT DOCUMENTS

| | | |
|---|---|---|
| CN | 1476142 A | 2/2004 |
| CN | 101052888 A | 10/2007 |
| JP | 06-133465 | 5/1994 |
| JP | 06-050247 U | 7/1994 |
| JP | 06-233468 | 8/1994 |
| JP | 08-070536 | 3/1996 |
| JP | 2001-169474 | 6/2001 |
| JP | 2005-513980 | 5/2005 |
| JP | 2009-077499 | 4/2009 |
| JP | 2009-142150 | 6/2009 |
| KR | 10-0294851 B1 | 4/2001 |
| KR | 10-2002-0016704 | 3/2002 |
| KR | 10-0456448 B1 | 11/2004 |
| KR | 1020050064259 | 6/2005 |
| KR | 1020060042025 | 5/2006 |
| KR | 20-2008-0000804 U | 5/2008 |
| TW | I249259 | 3/1991 |
| WO | WO 2006/035365 A2 | 4/2006 |

OTHER PUBLICATIONS

EPO Partial EESR dated Nov. 23, 2011 for EP Application No. 11250125.9 (6 pages).

SIPO Office action dated May 30, 2013 issued in Chinese application No. 201110153228.0 (9 pages) with English translation (15 pages).

Japanese Office action dated Dec. 19, 2012, for corresponding Japanese Patent application 2011-118717, (4 pages).

Patent Abstracts of Japan, and English machine translation of Japanese Publication 6-133465 listed above, (10 pages).

English machine translation of Japanese Publication 6-050247 listed above, (6 pages).

Patent Abstracts of Japan, and English machine translation of Japanese Publication 6-233468 listed above, (12 pages).

Patent Abstracts of Japan, and English machine translation of Japanese Publication 2001-169474 listed above, (14 pages).

Patent Abstracts of Japan, and English machine translation of Japanese Publication 2009-077499 listed above, (17 pages).

Korean Patent Abstracts for Korean Publication 10-2003-0095548, dated Dec. 24, 2003, corresponding to Korean Patent 10-0456448 listed above.

SIPO Office action dated Nov. 13, 2013, with English translation, for corresponding Chinese Patent application 201110153228.0, (27 pages).

* cited by examiner

BATTERY PACK HAVING BOOSTING CHARGE FUNCTION AND METHOD THEREOF

CROSS-REFERENCE TO RELATED APPLICATION

This application claims priority to and the benefit of U.S. Provisional Application No. 61/362,543, filed on Jul. 8, 2010, in the United States Patent and Trademark Office, the disclosure of which is incorporated herein in its entirety by reference.

TECHNICAL FIELD

Embodiments relate to a battery pack.

BACKGROUND ART

Generally, a battery that cannot again be used once discharged is called a primary battery, and a battery that may be reused after being discharged is called a secondary battery.

Recently, with the increase in the supply of portable devices such as feature phones, smart phones, Personal Digital Assistant (PDA) phones and digital cameras, the demand for secondary batteries is increasing rapidly. Secondary batteries used for portable devices require high-stability and a thin profile for convenient carrying as well as a long life that can be maintained after a short charging time.

A Constant Current mode-Constant Voltage mode charge method (CC-CV charge method) is generally used as a method for charging secondary batteries used for portable devices In charging the secondary batteries, the CC-CV charge method is one that performs charge with a certain constant current and thereafter charges the secondary battery with a constant voltage when a voltage close to a full-charge potential is reached.

Research on various charge methods that may perform more accurate full charge and perform charge at a faster charge speed than the CC-CV charge method is being conducted.

Furthermore, as the supply of various portable devices having a large consumption power increases rapidly, interest in batteries is increasing. Accordingly, a charge method and a charge apparatus are required which are more stable and may become fully charged in a shorter amount of time.

SUMMARY

An aspect of the present invention provides a battery pack having boosting charge function and a method thereof.

A battery pack having boosting charge function according to an embodiment amplifies a charge current that is supplied from the existing portable phone charger, a computer USB power source or the cigar jack power source of a vehicle (hereinafter referred to as a charger) and charges itself.

Moreover, a boosting charge method according to an embodiment includes amplifying a charge current which is supplied by a charger to charge a battery cell; and charging the battery cell with a constant voltage. In one embodiment, the charging of the battery cell may be substantially performed in a pulse charge scheme.

The charging of the battery cell may be continuously performed to the full charge voltage of the battery cell. For example, the full charge voltage may be set to about 4.1 to 4.25 V. During the charging of the battery cell, the amplified current may be substantially and incrementally reduced with the elapse of time. The amplified current may be set to about 110% to about 130% of the charge current that is supplied by the charger.

In one embodiment, a method of charging a battery pack is provided, the battery pack including at least one battery cell. The method includes comparing a battery cell voltage to a first voltage; comparing the battery cell voltage to a second voltage that is greater than the first voltage; and controlling a current amplifying unit coupled to the at least one battery cell to amplify a current from a charger to the at least one battery cell if the battery cell voltage is between the first voltage and the second voltage.

In one embodiment, in comparing the battery cell voltage, the first voltage is between about 3.0 V and about 4.2 V and wherein the second voltage is between about 4.1 V and about 4.25 V. Further, increasing the current may include increasing the current by between about 110% and about 130%.

Additionally, in one embodiment, controlling the current amplifying unit comprises providing a control signal from a control unit to the current amplifying unit. The method may also include determining whether a temperature of the at least one battery cell exceeds a reference temperature and terminating charging of the at least one battery cell if the temperature of the at least one battery cell exceeds the reference temperature.

In one embodiment, the method also includes pulse-charging the at least one battery cell if the battery cell voltage is greater than the second voltage, for example, by converting a voltage from the charger to a pulse-type voltage and supplying the pulse-type voltage to the at least one battery cell. The method may also include pre-charging the at least one battery cell if the voltage of the at least one battery cell is less than the first voltage.

In one embodiment, a battery pack is provided including at least one battery cell; and a current amplifying unit coupled to the at least one battery cell and configured to amplify a current from a charger to the at least one battery cell.

The battery pack may also include a pulse charge unit coupled to the at least one battery cell and configured to convert a voltage from the charger into a pulse-type voltage, a pre-charge unit for pre-charging the at least one battery cell, a voltage sensing unit for sensing a voltage of the at least one battery cell and/or a temperature sensing unit for sensing a temperature of the at least one battery cell. Additionally, the battery pack may include a control unit for providing a control signal to the current amplifying unit in accordance with a voltage of the at least one battery cell.

In one embodiment, the current amplifying unit includes a first transistor Q21 comprising a control electrode for receiving a control signal, a first electrode coupled to a ground reference, and a second electrode; a second transistor Q22 comprising a control electrode coupled to the second electrode of the first transistor Q21, a first electrode coupled to the charger, and a second electrode coupled to the at least one battery cell; and a capacitor coupled between the control electrode and the second electrode of the first transistor. In one embodiment, the current amplifying unit may also include a noise filter.

In another embodiment, the current amplifying unit may include a first transistor Q31 comprising a first electrode coupled to the charger, a second electrode, and a control electrode for receiving a control signal; a second transistor Q32 comprising a first electrode coupled to the second electrode of the first transistor Q31, a second electrode coupled to the at least one battery cell, and a control electrode; and a voltage regulator comprising an input terminal coupled to the second electrode of the first transistor and an output terminal coupled to the control electrode of the second transistor.

In yet another embodiment, the current amplifying unit includes a first transistor Q41 comprising a first electrode coupled to the charger, a second electrode, and a control electrode for receiving a control signal; a second transistor Q42 comprising a first electrode coupled to the second electrode of the first transistor, a second electrode coupled to the at least one battery cell, and a control electrode; and a voltage regulator comprising an input terminal coupled to the control electrode of the second transistor and an output terminal coupled to the second electrode of the second transistor.

A battery pack and method thereof according to embodiments considerably shorten the charge time of the battery pack by using a current amplifying-pulse charge scheme. As an example, the existing charge time takes about 3 to 4 hours, but according to embodiments, a charge time takes about 1.5 hours or less.

The battery pack and method thereof according to embodiments supply a small amount of current to the battery cell to allow the battery cell to be charged to an initial charge, and sense the voltage of the battery cell. When the voltage of the battery cell increases, the battery pack and method thereof determine that there is no error, and perform charge in accordance with a current amplifying-pulse charge scheme. When the voltage of the battery cell does not further increase, the battery pack and method thereof determine that a slight short occurs in the battery cell or that the battery cell has been completely discharged, and stops charging, thereby improving the stability of the battery pack.

Moreover, the battery pack and method thereof according to embodiments sense the temperature of the battery cell while the battery pack is being charged, and stops charging or decreases the charge current when the temperature of the battery cell exceeds the reference temperature, thereby enhancing the stability of the battery pack.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In this disclosure below, like reference numerals are used for referring to the same or similar elements or operations throughout. Moreover, when one part (or element, device, etc.) is referred to as being "connected" or "coupled" to another part (or element, device, etc.), it should be understood that the former can be "directly connected" to the latter, or "electrically connected" to the latter via an intervening part (or element, device, etc.) or both.

Figure 1:
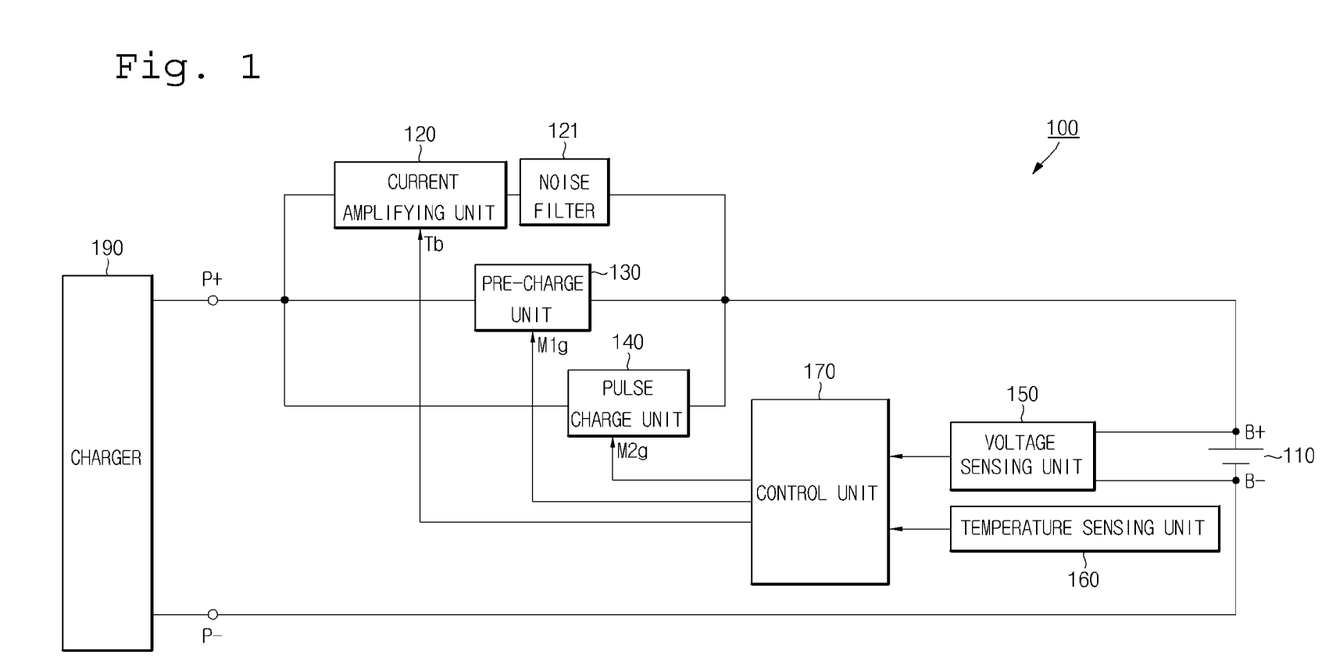
FIG. 1 illustrates a block diagram of a battery pack having boosting charge function according to an embodiment.

FIG. 1 illustrates a block diagram of a battery pack having boosting charge function according to an embodiment.

Referring to FIG. 1, a battery pack 100 having boosting charge function according to an embodiment includes at least one battery cell 110, a current amplifying unit 120, a pre-charge unit 130, and a pulse charge unit 140. The current amplifying unit 120 is connected between the battery cell 110 and a charger 190 and amplifies a current from the charger 190 to quickly charge the battery cell 110. The pre-charge unit 130 is connected between the battery cell 110 and the charger 190 and decreases a voltage from the charger 190 to pre-charge the battery cell 110. The pulse charge unit 140 is connected between the battery cell 110 and the charger 190 and converts a voltage from the charger 190 into a pulse-type voltage to pulse-charge the battery cell 110.

In addition, the battery pack 100 according to an embodiment may include a voltage sensing unit 150 and a temperature sensing unit 160. Moreover, the battery pack 100 may further include a control unit 170 that receives the signal of the voltage sensing unit 150 and the signal of the temperature sensing unit 160 to control the current amplifying unit 120, the pre-charge unit 130 and the pulse charge unit 140 according to an algorithm. Furthermore, the battery pack 100 includes a pack positive terminal P+ and a pack negative terminal P−, and the pack positive terminal P+ and the pack negative terminal P− configured to be connected to the external charger 190 or an external load.

The battery cell 110 may be a secondary battery that has a cell positive terminal B+ and a cell negative terminal B− and may be recharged. For example, the battery cell 110 may be any one that is selected from among a lithium ion battery, a lithium polymer battery, a lithium ion polymer battery and equivalent materials thereof, but an embodiment is not limited thereto. Also, the battery cell 110 may be any one that is selected from among a cylinder type battery, a prismatic type battery, a pouch type battery and equivalent materials thereof, but an embodiment is not limited thereto.

The current amplifying unit 120 is connected between the pack positive terminal P+ and the cell positive terminal B+. The current amplifying unit 120 operates according to a control signal Tb of the control unit 170, and amplifies a current supplied from the charger 190 to supply the amplified current to the battery cell 110. Herein, when the voltage of the battery cell 110 sensed by the voltage sensing unit 150, for example, is determined as about 3.0 to 4.2 V, the control unit 170 fundamentally outputs the control signal Tb for operating the current amplifying unit 120 to the current amplifying unit 120. Furthermore, in one embodiment, the current amplifying unit 120 does not amplify a voltage supplied from the charger 190 but amplifies only a current to supply the amplified current to the battery cell 110. The current amplifying unit 120, for example, amplifies a current supplied from the charger 190 by between about 110% to about 130% (in one embodiment, by about 125%) and supplies the amplified current to the battery cell 110. When the current amplifying rate is less than about 110%, the charge time of the battery cell 110 is not greatly shortened. Herein, the full charge time of the battery cell 110 is typically about 3 to 4 hours. Moreover, when the current amplifying rate exceeds about 130%, the battery cell 110 may be deteriorated. That is, the life of the battery cell 110 may be shortened.

The noise filter 121 may further be connected between the current amplifying unit 120 and the battery cell 110. The noise filter 121 filters various electrical noises that are generated from the current amplifying unit 120.

The pre-charge unit 130 is connected between the pack positive terminal P+ and the cell positive terminal B+. The pre-charge unit 130 operates according to a control signal M1g of the control unit 170, and decreases a voltage supplied from the charger 190 to supply the decreased voltage to the battery cell 110. In one embodiment, when the voltage of the battery cell 110 sensed by the voltage sensing unit 150, for example, is determined to be lower than about 3.0V, the control unit 170 fundamentally outputs the control signal M1g for operating the pre-charge unit 130 to the current amplifying unit 120. The pre-charge unit 130, for example, supplies between about 10% to about 40% of the voltage supplied from the charger 190 to the battery cell 110. For example, when the voltage supplied from the charger 190 is about 4.2V, the pre-charge unit 130 supplies about 4.2*(1/10) V to 4.2*(4/10) V to the battery cell 110. If the pre-charge voltage is lower than about 10%, pre-charge is performed for a very long time. Also, if the pre-charge voltage exceeds about 40%, the battery cell 110 may be deteriorated.

Although a certain amount of time elapses during pre-charging, the control unit 170 determines that if a slight short occurs in the battery cell 110 or if the battery cell 110 is completely discharged and stops the charge of the battery cell 110 when the voltage of the battery cell 110 is less than about 3.0 V.

The pulse charge unit 140 is connected between the pack positive terminal P+ and the cell positive terminal B+. The pulse charge unit 140 operates according to a control signal M2g of the control unit 170, and converts a voltage supplied from the charger 190 into a pulse-type voltage to supply the pulse-type voltage to the battery cell 110. Herein, when the voltage of the battery cell 110 sensed by the voltage sensing unit 150, for example, is determined as exceeding between about 4.1 to about 4.25 V (in one embodiment, about 4.2 V), the control unit 170 fundamentally outputs the control signal M2g for operating the pulse charge unit 140. If the voltage is lower than about 4.1 V, the full charge of the battery cell 110 is performed for a very long time. Also, if the voltage exceeds about 4.25 V, the battery cell 110 may be deteriorated.

In one embodiment, the current amplifying unit 120 operates when the voltage of the battery cell 110 is about 3.0 to 4.2 V, while the pulse charge unit 140 operates when the voltage of the battery cell 110 is about 4.1 to 4.25 V. Therefore, the range of the voltages for the battery cell 110 seem to overlap each other.

However, in reality, there is no overlapping voltage range. For example, in one embodiment, the current amplifying unit 120 operates when the voltage of the battery cell 110 is about 3.0 to 4.1 V, while the pulse charge unit 140 operates when the voltage of the battery cell 110 exceeds about 4.1 V. In another example, the current amplifying unit 120 operates when the voltage of the battery cell 110 is about 3.0 to 4.2 V, while the pulse charge unit 140 operates when the voltage of the battery cell 110 exceeds about 4.2 V. In other words, the current amplifying unit operates at a first voltage range that is less than a voltage range at which the pulse charge unit operates, but there is no overlap. The range of the voltage for the battery cell 110 may vary according to the capacity or usage of the battery pack, but it is not limited thereto.

The voltage sensing unit 150 is connected to the battery cell 110 in parallel and senses the voltage of the battery cell 110. Furthermore, the voltage sensing unit 150 converts the sensed analog voltage value of the battery cell 110 into a digital voltage value and provides the digital voltage value to the control unit 170.

The temperature sensing unit 160 is pressed against the battery cell 110 or is located in a periphery and senses the temperature of the battery cell 110. The temperature sensing unit 160 converts the sensed analog temperature value of the battery cell 110 into a digital temperature value and provides the digital temperature value to the control unit 170.

The control unit 170 receives the signal of the voltage sensing unit 150 and the signal of the temperature sensing unit 160 and outputs respective control signals to the current amplifying unit 120, the pre-charge unit 130 and the pulse charge unit 140 according to an algorithm. For example, when the voltage of the battery cell 110 sensed by the voltage sensing unit 150 is about 3.0 to 4.2 V, the control unit 170 allows the current amplifying unit 120 to amplify a current from the charger 190 and supply the amplified current to the battery cell 110 by outputting the control signal Tb to the current amplifying unit 120. When the voltage of the battery cell 110 sensed by the voltage sensing unit 150 is lower than about 3.0 V, the control unit 170 allows the pre-charge unit 130 to decrease a voltage from the charger 190 and supply the decreased voltage to the battery cell 110 by outputting the control signal M1g to the pre-charge unit 130. When the voltage of the battery cell 110 sensed by the voltage sensing unit 150 exceeds about 4.1 to 4.25 V or 4.2V, by outputting the control signal M2g to the pulse charge unit 140, the control unit 170 allows the pulse charge unit 140 to convert a voltage from the charger 190 into a pulse-type voltage and supply the pulse-type voltage to the battery cell 110. Moreover, when the temperature of the battery cell 110 sensed by the temperature sensing unit 160 exceeds about 55 to 60° C., the control unit 170 stops the charge of the battery cell 110. That is, the control unit 170 stops the operation of the current amplifying unit 120, pre-charge unit 130 or pulse charge unit 140, and thus the temperature of the battery cell 110 does not further increase. As the temperature of the battery cell 110 increases, the control unit 170 decreases a current amplifying rate, a pre-charge voltage or a pulse width, thereby suppressing the temperature increase of the battery cell 110.

The charger 190 is connected between the pack positive terminal P+ and the pack negative terminal P− in parallel and supplies a charge current and a charge voltage to the battery cell 110. The charger 190, for example, may be a portable phone charger 190 (standard charger) for supplying an output voltage of about 4.2 V and a current of about 600 to 800 mA, or a computer USB power source having an output voltage of about 5 V and a current of about 500 mA. Herein, the output voltages and currents of the portable phone charger 190 and computer USB power source are standardized internationally. Furthermore, the charger 190 may be a cigar jack power source of a vehicle that has an output voltage of about 12 V and a current of about 500 mA.

Figure 2:
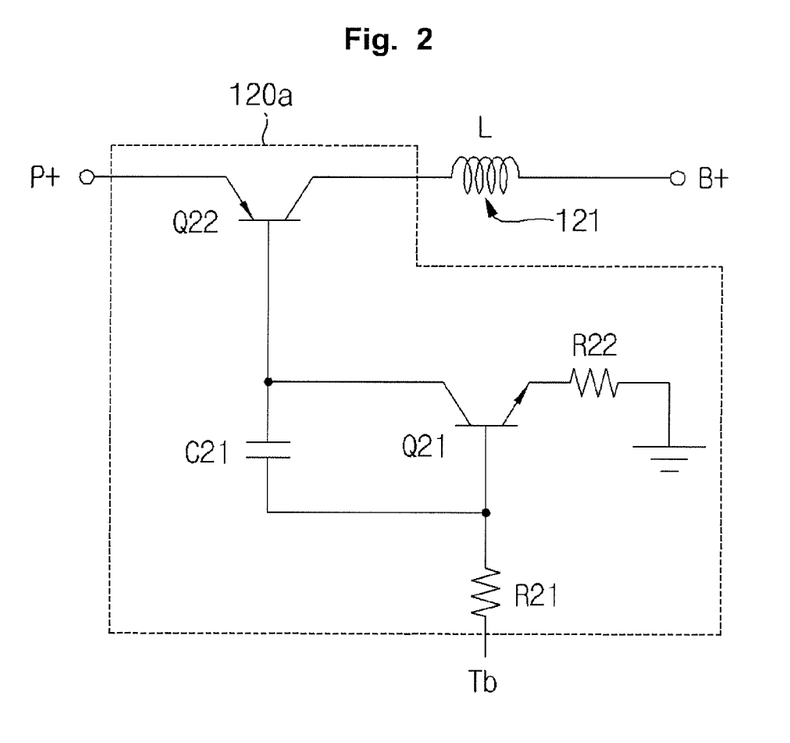
FIG. 2 illustrates a circuit diagram of a current amplifying unit and noise filter of a battery pack having boosting charge function according to an embodiment.

FIG. 2 illustrates a circuit diagram of a current amplifying unit and noise filter of a battery pack having boosting charge function according to an embodiment.

Referring to FIG. 2, a current amplifying unit 120a includes a first resistor R21, a first transistor Q21, a first capacitor C21, a second resistor R22, and a second transistor Q22.

The first resistor R21 is connected between the first transistor Q21 and the control unit 170. That is, a first electrode of the first resistor R21 is connected to the control unit 170, and a second electrode of the first resistor R21 is connected to the first transistor Q21. Accordingly, the control signal Tb of the control unit 170 is applied to the first transistor Q21 through the first resistor R21.

The first transistor Q21 includes a control electrode, a first electrode, and a second electrode. A second electrode of the first resistor R21 is connected to the control electrode of the first transistor Q21. The first capacitor C21 and the second transistor Q22 are connected to the first electrode of the first transistor Q21. The second resistor R22 is connected to the second electrode of the first transistor Q21. Herein, the first transistor Q21 may be an NPN power transistor.

The first capacitor C21 is connected between the first electrode and control electrode of the first transistor Q21. That is, a first electrode of the first capacitor C21 is connected to the first electrode of the first transistor Q21, and a second electrode of the capacitor C21 is connected to the control electrode of the first transistor Q21.

The second resistor R22 is connected between the second electrode of the first transistor Q21 and a ground terminal. That is, a first electrode of the second resistor R22 is connected to the second electrode of the first transistor Q21, and a second electrode of the second resistor R22 is grounded.

The second transistor Q22 includes a control electrode, a first electrode, and a second electrode. The first electrode of the first capacitor C21 and the first electrode of the first transistor Q21 are connected to the control electrode of the second transistor Q22. Also, the pack positive terminal P+ is connected to the first electrode of the second transistor Q22. Accordingly, a current from the charger 190 is supplied to the first electrode of the second transistor Q22. Moreover, the cell positive terminal B+ is electrically connected to the second electrode of the second transistor Q22. Therefore, the battery cell 110 receives an amplified current through the second electrode of the second transistor Q22. Herein, the second transistor Q22 may be a PNP power transistor.

The noise filter 121 may be substantially connected between the second electrode of the second transistor Q22 and the cell positive terminal B+. Herein, the noise filter 121 may be an inductor L.

Consequently, the current amplifying unit 120a may be a cascaded pair of power transistors that boost a current from the charger 190 and supply the boosted current to the battery cell 110.

The following description will be related to the current amplifying unit 120a.

First, the control unit 170 provides a control signal Tb of about 0.7 V or higher to the first resistor R21. Then, a current Ibe (current from base to emitter) flows through the first resistor R21, the control electrode and second electrode of the first transistor Q21 and the second resistor R22.

Since the first transistor Q21 and the second transistor Q22 are a power transistor, a gain is about 50 times. That is, a current Ice that flows from the first electrode of the first transistor Q21 to the second electrode of the first transistor Q21 may be about 50 times higher than the current Ibe.

Herein, the current Ice that flows through from the first and second electrodes of the first transistor Q21 is supplied from the control electrode of the second transistor Q22. Also, a current that flows through the first and second electrodes of the second transistor Q22 is amplified by about 50 times by a current that flows through the control electrode of the second transistor Q22.

As a result, a charge current that is supplied through the pack positive terminal P+ is amplified by the second transistor Q22 and is supplied to the cell positive terminal B+. As an example, a current of about 500 mA that is supplied from the charger 190 may be amplified to a current of about 1 to 1.5 A and be supplied to the battery cell 110. In the current amplifying unit 120a, the gain of the first transistor Q21 and the gain of the second transistor Q22 are appropriately controlled, and thus, as described above, a current supplied from the charger 190 may be amplified by about 110% to 130% and be supplied to the battery cell 110.

Furthermore, an electrical noise that may occur in an amplified current is filtered by the noise filter 121 that is serially connected to the second transistor Q22 and the cell positive terminal B+.

Moreover, the current amplifying unit 120a is suitable when the charger 190 is a portable phone charger or a computer USB power source because a voltage supplied through the pack positive terminal P+ by the current amplifying unit 120a is similar to a voltage that is supplied to the cell positive terminal B+ by the current amplifying unit 120a and a current is amplified.

Figure 3:
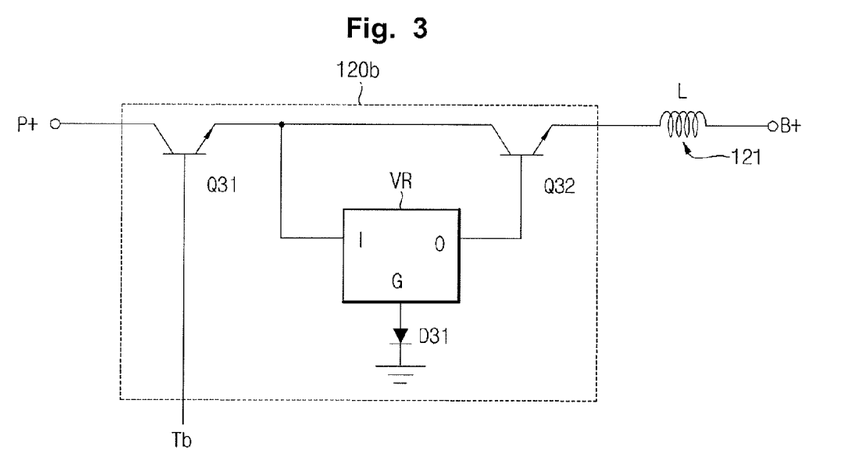
FIG. 3 illustrates a circuit diagram of a current amplifying unit and noise filter of a battery pack having boosting charge function according to another embodiment.

FIG. 3 illustrates a circuit diagram of a current amplifying unit and noise filter of a battery pack having boosting charge function according to another embodiment.

Referring to FIG. 3, a current amplifying unit 120b according to another embodiment includes a first transistor Q31, a voltage regulator VR, a second transistor Q32, and a diode D31.

The first transistor Q31 includes a control electrode, a first electrode, and a second electrode. The control electrode of the first transistor Q31 is connected to the control unit 170, and thus it receives the control signal Tb from the control unit 170. The first electrode of the first transistor Q31 is connected to the pack positive terminal P+, and the second electrode of the first transistor Q31 is connected to the voltage regulator VR and the second transistor Q32.

The voltage regulator VR includes an input terminal I, an output terminal O, and a ground terminal G. The input terminal I of the voltage regulator VR is connected to the second electrode of the first transistor Q31 and the second transistor Q32. The output terminal O of the voltage regulator VR is connected to the second transistor Q32. The ground terminal G of the voltage regulator VR is connected to the diode D31.

The second transistor Q32 includes a control electrode, a first electrode, and a second electrode. The control electrode of the second transistor Q32 is connected to the output terminal O of the voltage regulator VR. The first electrode of the second transistor Q32 is connected to the second electrode of the first transistor Q31 and the input terminal I of the voltage regulator VR. The second electrode of the second transistor Q32 is connected to the cell positive terminal B+.

The diode D31 is connected between the ground terminal G of the voltage regulator VR and a ground terminal. That is, a first electrode of the diode D31 is connected to the ground terminal G of the voltage regulator VR, and a second terminal of the diode D31 is connected to the ground terminal. The diode D31 compensates for a voltage drop between the control electrode and second electrode of the second transistor Q32.

The noise filter 121 may be substantially and electrically connected between the second electrode of the second transistor Q32 and the cell positive terminal B+. Herein, the noise filter 121 may be an inductor L.

When the control unit 170 provides the control signal Tb to the control electrode of the first transistor Q31, the first transistor Q31 is turned on, and thus the current amplifying unit 120b operates. In this way, when the first transistor Q31 is turned on, a power source from the pack positive terminal P+ is supplied to the input terminal I of the voltage regulator VR and the first electrode of the second transistor Q32.

A voltage between the ground terminal G and output terminal O of the voltage regulator VR typically has a constant feature. Accordingly, a current supplied to the cell positive terminal B+ through the second electrode of the second transistor Q32 is amplified. That is, a current from the pack positive terminal P+ is amplified and is supplied to the cell positive terminal B+. As another example, a current from the charger 190 is amplified and is supplied to the battery cell 110.

The current amplifying unit 120b is suitable when the charger 190 is a cigar jack power source for a vehicle because a voltage supplied through the pack positive terminal P+ is higher than a voltage supplied to the cell positive terminal B+, or because a voltage inputted to the input terminal of the voltage regulator VR is higher than a voltage that is outputted through the output terminal of the voltage regulator VR.

Figure 4:
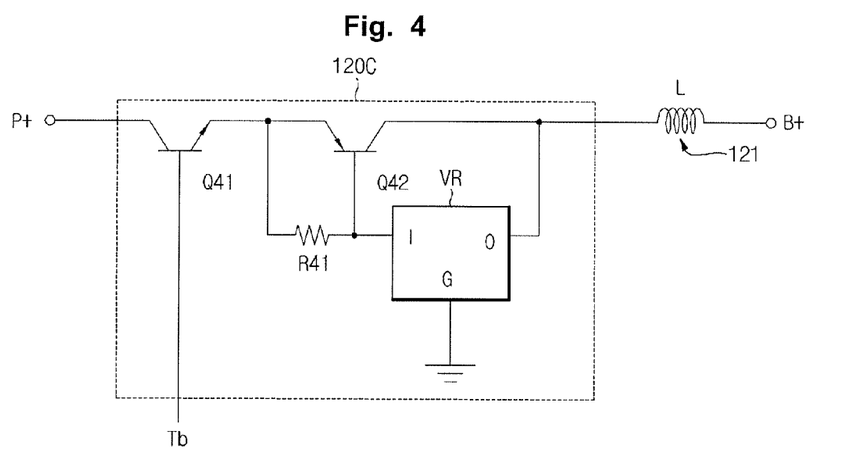
FIG. 4 illustrates a circuit diagram of a current amplifying unit and noise filter of a battery pack having boosting charge function according to yet another embodiment.

FIG. 4 illustrates a circuit diagram of a current amplifying unit and noise filter of a battery pack having boosting charge function according to another embodiment.

Referring to FIG. 4, a current amplifying unit 120c according to another embodiment includes a first transistor Q41, a second transistor Q42, a resistor R41, and a voltage regulator VR.

The first transistor Q41 includes a control electrode, a first electrode, and a second electrode. The control electrode of the first transistor Q41 is connected to the control unit 170, and thus it receives the control signal Tb from the control unit 170. The first electrode of the first transistor Q41 is connected to the pack positive terminal P+, and the second electrode of the first transistor Q41 is connected to the second transistor Q42 and the resistor R41.

The second transistor Q42 includes a control electrode, a first electrode, and a second electrode. The control electrode of the second transistor Q42 is connected to the resistor R41 and the voltage regulator VR. The first electrode of the second transistor Q42 is connected to the second electrode of the first transistor Q41 and the resistor R41. The second electrode of the second transistor Q42 is connected to the voltage regulator VR and the cell positive terminal B+.

The resistor R41 is connected between the first transistor Q41, the second transistor Q42 and the voltage regulator VR. That is, a first electrode of the resistor R41 is connected to the second electrode of the first transistor Q41 and the first electrode of the second transistor Q42. A second electrode of the resistor R41 is connected to the control electrode of the second transistor Q42 and an input terminal I of the voltage regulator VR.

The voltage regulator VR includes an input terminal I, an output terminal O, and a ground terminal G. The input terminal I of the voltage regulator VR is connected to a second electrode of the resistor R41 and the second electrode of the second transistor Q42. The output terminal O of the voltage regulator VR is connected to the second electrode of the second transistor Q42 and the cell positive terminal B+. The ground terminal G of the voltage regulator VR is grounded.

The noise filter 121 may be substantially and electrically connected between the second electrode of the second transistor Q42 and the cell positive terminal B+. Herein, the noise filter 121 may be an inductor L.

Substantially, since the current amplifying unit 120b of FIG. 3 uses an NPN type of second transistor Q32, the output voltage of the voltage regulator VR is lower than the original output voltage. However, since the current amplifying unit 120c of FIG. 4 uses a PNP type of second transistor Q42 (i.e., power transistor), the original output voltage of the voltage regulator VR may be maintained.

Herein, since the operation of the current amplifying unit 120c of FIG. 4 is substantially similar to that of the current amplifying unit of FIG. 3, any further description will be omitted.

Furthermore, the current amplifying unit 120c is suitable when the charger 190 is a cigar jack power source for a vehicle because a voltage supplied through the pack positive terminal P+ is higher than a voltage supplied to the cell positive terminal B+.

Figure 5:
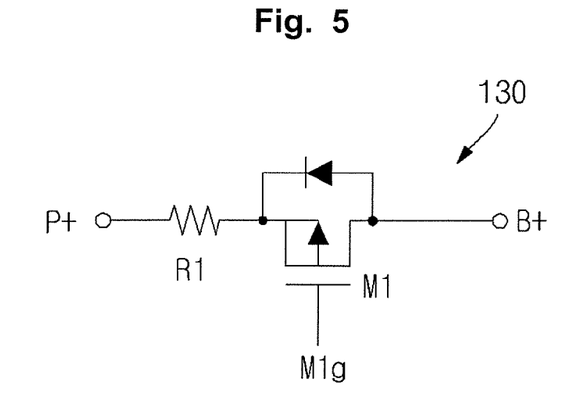
FIG. 5 illustrates a circuit diagram of a pre-charge unit of a battery pack having boosting charge function according to an embodiment.

FIG. 5 illustrates a circuit diagram of a pre-charge unit of a battery pack having boosting charge function according to an embodiment.

Referring to FIG. 5, the pre-charge unit 130 includes a resistor R1 and a transistor M1. A first electrode of the resistor R1 is connected to the pack positive terminal P+, and a second electrode of the resistor R1 is connected to the transistor M1. The transistor M1 includes a control electrode, a first electrode, and a second electrode. The control electrode receives the control signal M1g from the control unit 170. The first electrode of the transistor M1 is connected to a second electrode of the resistor R1. The second electrode of the transistor M1 is connected to the cell positive terminal B+. Herein, the transistor M1 may be a P-channel MOSFET having a body diode.

When the control unit 170 applies the control signal M1g to the control electrode of the transistor M1, the pre-charge unit 130 operates and since a certain voltage is applied to the resistor R1, a voltage supplied from the pack positive terminal P+ decreases in proportion to the applied voltage and is supplied to the cell positive terminal B+. That is, a voltage supplied from the charger 190 decreases and is supplied to the battery cell 110.

In this way, the pre-charge unit 130 may supply about 10% to about 40% of the voltage supplied from the charger 190 to the battery cell 110.

Figure 6:
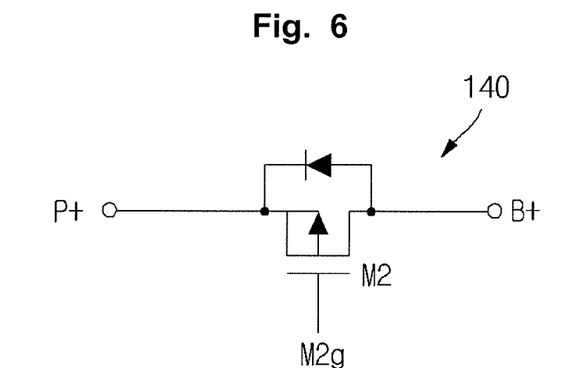
FIG. 6 illustrates a circuit diagram of a pulse charge unit of a battery pack having boosting charge function according to an embodiment.

FIG. 6 illustrates a circuit diagram of a pulse charge unit of a battery pack having boosting charge function according to an embodiment.

Referring to FIG. 6, the pulse charge unit 140 includes a transistor M1. The transistor M1 includes a control electrode, a first electrode, and a second electrode. The control electrode receives the control signal M2g from the control unit 170. The first electrode of the transistor M1 is connected to the pack positive terminal P+. The second electrode of the transistor M1 is connected to the cell positive terminal B+. Herein, the transistor M2 may be a P-channel MOSFET having a body diode.

When the control unit 170 applies the control signal M2g to the control electrode of the transistor M2, the pulse charge unit 140 operates. Herein, the control signal M2g is supplied at intervals of about 3 ms to about 3 s, a voltage supplied from the pack positive terminal P+ is converted into a pulse-type voltage and is supplied to the cell positive electrode B+. That is, a voltage supplied from the charger 190 is converted into a pulse-type voltage and is supplied to the battery cell 110.

Figure 7:
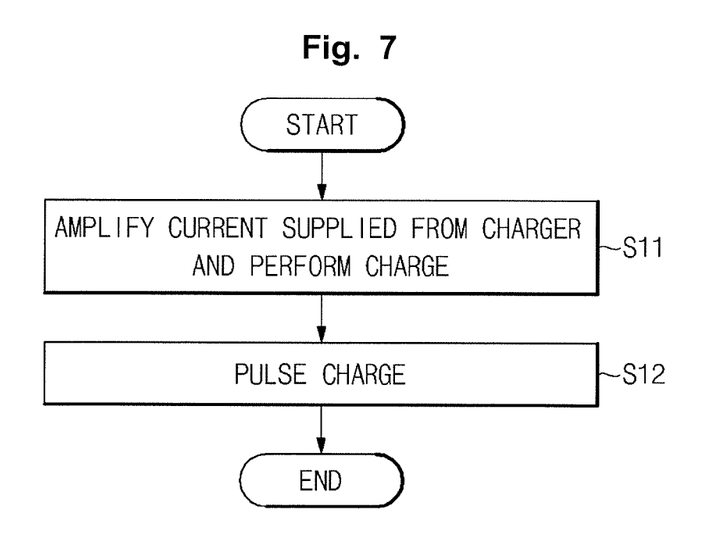
FIG. 7 illustrates a schematic flowchart of a boosting charge method according to an embodiment.

FIG. 7 illustrates a schematic flowchart of a boosting charge method according to an embodiment.

Referring to FIG. 7, a boosting charge method according to an embodiment includes: a current amplification charge operation S11 that amplifies a current supplied from a charger to perform charge; and a pulse charge operation S12 that converts a voltage supplied from the charger into a pulse type to perform charge. In one embodiment, the charger may be a portable phone charger, a computer USB power source or a cigar jack of a vehicle in accordance with an international standard.

The current amplification charge operation S11 amplifies the current supplied from the charger by about 110% to about 130% (in one embodiment, about 125%) and supplies the amplified current to a battery cell, thereby allowing the battery cell to be charged by the amplified current.

The pulse charge operation S12 converts a Direct Current (DC) voltage supplied from the charger into a pulse-type voltage and supplies the pulse-type voltage to the battery cell, thereby allowing the battery cell to be charged with the pulse-type voltage.

Figure 8:
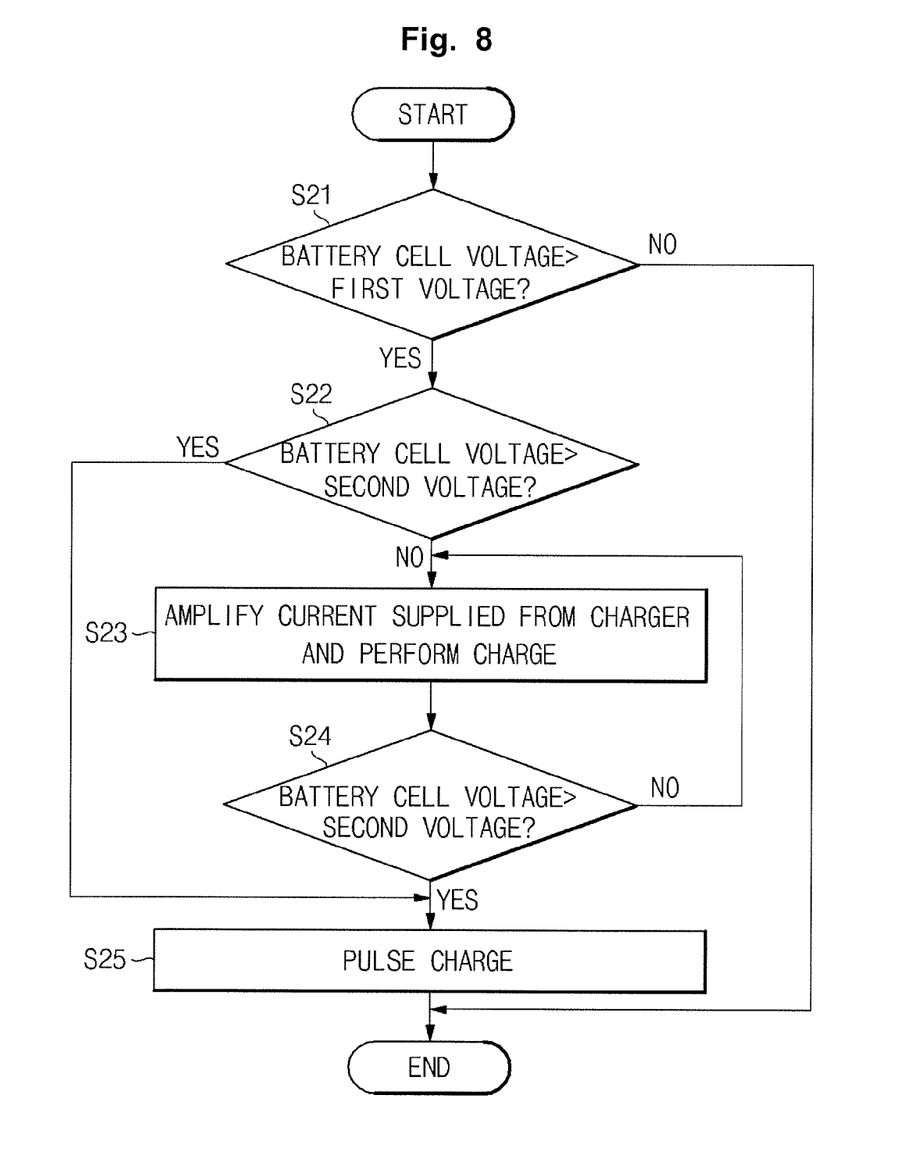
FIG. 8 illustrates a schematic flowchart of a boosting charge method according to another embodiment.

FIG. 8 illustrates a schematic flowchart of a boosting charge method according to another embodiment.

Referring to FIG. 8, a boosting charge method according to another embodiment includes: determining whether a battery cell voltage exceeds a first voltage in operation S21; determining whether a battery cell voltage exceeds a second voltage in operation S22; amplifying a current supplied from a charger to perform charge in operation S23; determining whether the battery cell voltage exceeds a second voltage in operation S24; and performing pulse charge in operation S25.

In operation S21 that determines whether a battery cell voltage exceeds a first voltage, whether the battery cell voltage exceeds the first voltage is determined. In one embodiment, whether the voltage of the battery cell exceeds about 3.0 V is determined.

In operation S22 that determines whether a battery cell voltage exceeds a second voltage, whether the battery cell voltage exceeds the second voltage is determined. In one embodiment, whether the voltage of the battery cell exceeds about 4.1 to 4.25 V or 4.2V is determined.

In operation S23 that amplifies a current supplied from a charger to perform charge, when the voltage of the battery cell exceeds about 3.0 to 4.2 V, the current supplied from the charger is amplified and charges the battery cell.

In operation S24 that determines whether the battery cell voltage exceeds a second voltage, whether the voltage of the battery cell exceeds about 4.1 to 4.25 V or about 4.2 V is determined.

Figure 9:
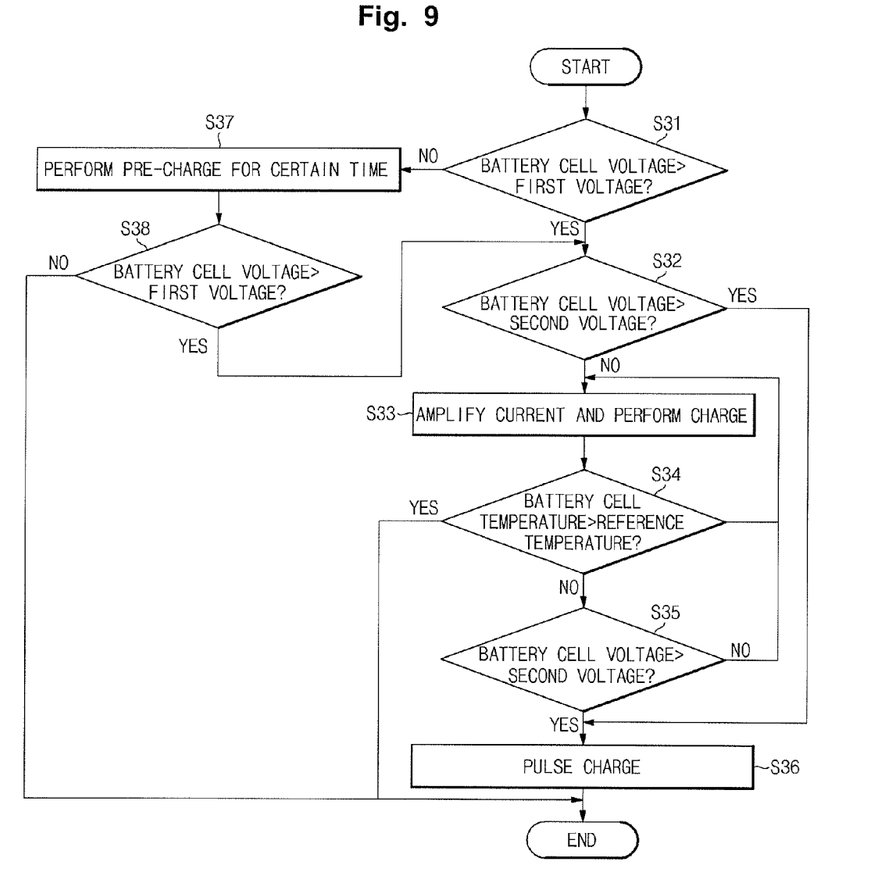
FIG. 9 illustrates a flowchart of a boosting charge method according to an embodiment.
Figure 10:
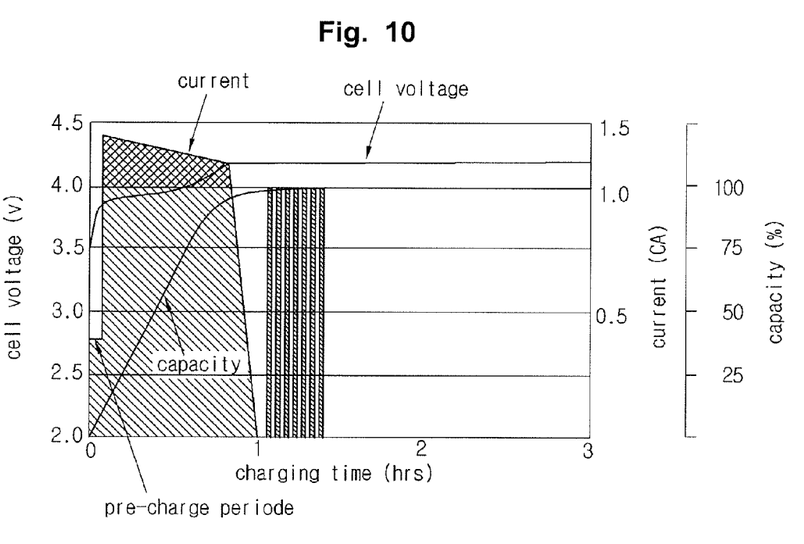
FIG. 10 is a graph showing relationships between a current, a cell voltage, a capacity and a charge time during boosting charge according to an embodiment.

In operation S25 that performs pulse charge, when the voltage of the battery cell exceeds about 4.1 to 4.25 V or 4.2 V, the DC voltage supplied from the charger is converted into the pulse-type voltage and charges the battery cell FIG. 9 illustrates a flowchart of a boosting charge method according to an embodiment. FIG. 10 is a graph showing relationships between a current, a cell voltage, a capacity and a charge time during boosting charge according to an embodiment.

A boosting charge method according to an embodiment will be described below with reference to FIGS. 1, 9 and 10. Herein, a boosting charge method according to an embodiment is controlled by the control unit 170 of FIG. 1.

Referring to FIG. 9, a boosting charge method according to an embodiment includes: determining whether a voltage of a battery cell exceeds a first voltage in operation S31; determining whether the voltage of the battery cell exceeds a second voltage in operation S32; amplifying a current to perform charge in operation S33; determining whether the voltage of the battery cell exceeds a second voltage in operation S35; and performing pulse charge in operation S36.

The boosting charge method according to an embodiment may further include determining whether the temperature of the battery cell exceeds a reference temperature in operation S34.

The boosting charge method according to an embodiment may further include: performing pre-charge in operation S37; and determining whether the voltage of the battery cell exceeds the first voltage in operation S38.

The boosting charge method according to an embodiment will be described below in more detail.

In operation S31 that determines whether a voltage of a battery cell exceeds a first voltage in operation S31, the control unit 170 determines whether the voltage of the battery cell 110 exceeds the first voltage with the voltage sensing unit 150. In one embodiment, the first voltage may be set as about 3.0 V, but it is not limited thereto.

When the voltage of the battery cell 110 exceeds the first voltage as the determined result, the control unit 170 performs operation S32. When the voltage of the battery cell 110 is lower than the first voltage as the determined result, the control unit 170 performs operation S37. Operation S37 will be again described below.

In operation S32 that determines whether the voltage of the battery cell exceeds a second voltage, the control unit 170 determines whether the voltage of the battery cell 110 exceeds the second voltage with the voltage sensing unit 150. In one embodiment, the second voltage may be set as about 4.1 to 4.25 V or about 4.2 V, but it is not limited thereto.

When the voltage of the battery cell 110 exceeds the second voltage as the determined result, the control unit 170 performs operation S36. When the voltage of the battery cell 110 is lower than the second voltage as the determined result, the control unit 170 performs operation S33. Operation S36 will be again described below.

In operation S33 that amplifies a current to perform charge, the control unit 170 provides the control signal Tb to the current amplifying unit 120 and thus allows the current amplifying unit 120 to operate. The current amplifying unit 120 amplifies a current supplied from the pack positive terminal P+ by about 110% to about 130% (in one embodiment, about 125%) and supplies the amplified current to the cell positive terminal B+. That is, the current amplifying unit 120 amplifies the original charge current supplied from the charger 190 by about 110% to about 130% (in one embodiment, about 125%) and supplies the amplified current to the battery cell 110. Herein, when the current amplifying rate is lower than about 110%, the charge of the battery cell 110 is performed for a relatively long time. Moreover, when the current amplifying rate exceeds about 130%, the battery cell 110 is quickly deteriorated, and thus the life of the battery cell 110 may be shortened.

For example, as shown in FIG. 10, when it is assumed that a current supplied from the charger 190 is about 1 A, a current is amplified to about 1.1 to 1.3 A by the current amplifying unit 120. Although a charge time by an amplified current varies with the capacity of the battery cell 110, the battery cell 110 used for portable phones typically takes about one hour, and at this point, the battery cell 110 is substantially charged to a capacity of about 93% to 96%. In a related art CC-CV charge method, by performing charge for about one hour, the battery cell 110 is charged to a capacity of about 83% to about 86%. According to an embodiment, therefore, about a 10% increase in charging can be achieved in the same amount of time compared to an existing charger.

As shown in FIG. 10, a current amplified by the current amplifying unit 120 is slowly decreased over time. This occurs because the voltage of the battery cell 110 increases. By more accurately designing the circuit of the current amplifying unit 120, an amplified current may be consistently outputted regardless of the time elapsed.

In operation S34 that determines whether the temperature of the battery cell exceeds a reference temperature, the control unit 170 determines whether the temperature of the battery cell 110 exceeds about 55° C. to about 60° C. with the temperature sensing unit 160. When the temperature of the battery cell 110 exceeds about 55° C. to about 60° C. as the determined result, the control unit 170 stops charge for the stability of the battery cell 110. When the temperature of the battery cell 110 is equal to or lower than about 55° C. to about 60° C. as the determined result, the control unit 170 performs operation S35.

Operation S34 may be performed in any stage of the boosting charge method according to an embodiment, as described herein, and is not necessarily performed between operation S33 and operation S35. That is, in an embodiment, once the temperature of the battery cell 110 exceeds about 55 to 60° C., the control unit 170 stops the operations of the current amplifying unit 120, pre-charge unit 130 and pulse charge unit 140 in all operations, thereby securing the stability of the battery cell 110. When the temperature of the battery cell 110 exceeds about 55° C. to about 60° C., the control unit 170 lowers a current amplifying rate, decreases a pre-charge voltage or narrows a pulse charge width without the stop of charge according to a more complicated algorithm, thereby securing the stability of the battery cell 110.

In operation S35 that determines whether the voltage of the battery cell exceeds a second voltage, the control unit 170 determines whether the voltage of the battery cell 110 exceeds the second voltage with the voltage sensing unit 150. Herein, the second voltage may be set as about 4.1 to 4.25 V or about 4.2 V, but it is not limited thereto.

When the voltage of the battery cell 110 exceeds the second voltage as the determined result, the control unit 170 performs operation S36. When the voltage of the battery cell 110 is equal to or lower than the second voltage as the determined result, the control unit 170 performs operation S33. That is, the control unit 170 amplifies a current from the charger 190 to charge the battery cell 110 until the voltage of the battery cell 110 reaches the second voltage. Herein, it has been described above that about one hour lapses until the voltage of the battery cell 110 reaches the second voltage.

When the voltage of the battery cell 110 exceeds the second voltage as the determined result, by stopping the output of the control signal Tb, the control unit 170 allows the operation of the current amplifying unit 120 to be stopped.

In operation S36 that performs pulse charge, by providing the control signal M2g to the pulse charge unit 140, the control unit 170 allows the pulse charge unit 140 to operate. The pulse charge unit 140, as described above, converts a voltage from the pack positive terminal P+ into a pulse-type voltage and supplies the pulse-type voltage to the cell positive terminal B+. That is, the pulse charge unit 140 converts a DC voltage from the charger 190 into a pulse-type voltage and supplies the pulse-type voltage to the battery cell 110. To provide a more detailed description, the pulse charge unit 140 converts a voltage from the charger 190 into a pulse-type voltage having intervals of about 3 ms to about 3 s and supplies the pulse-type voltage to the battery cell 110. For example, as shown in FIG. 10, the pulse charge unit 140 converts a voltage from the charger 190 into a pulse-type voltage and supplies the pulse-type voltage to the battery cell 110 for about 3 ms to 3 s, and then the pulse charge unit 140 does not supply the voltage from the charger 190 to the battery cell 110 for about 3 ms to about 3 s. The pulse charge unit 140 repeats such an operation for about 0.4 to 0.6 hours and stops the operation. That is, the control unit 170 stops the output of the control signal M2g after the time, and thus the operation of the pulse charge unit 140 is stopped.

When the voltage of the battery cell 110 is determined as lower than the first voltage in operation S31 where the control unit 170 determines whether the voltage of the battery cell 110 exceeds the first voltage, the boosting charge method according to an embodiment performs pre-charge operation S37.

That is, by providing the control signal M1g to the pre-charge unit 130, the control unit 170 allows the pre-charge 130 to operate. The pre-charge unit 130, as described above, decreases a voltage supplied from the pack positive terminal P+ and supply about 10% to about 40% of the voltage from the pack positive terminal P+ to the cell positive terminal B+. That is, the pre-charge unit 130 decreases a voltage supplied from the charger 190 and supply about 10% to about 40% of the voltage from the charger 190 to the battery cell 110. When the pre-charge voltage is lower than about 10%, pre-charge is performed for a very long time. Moreover, when the pre-charge voltage exceeds about 40%, the battery cell 110 may be deteriorated.

The control unit 170 pre-charges the battery cell 110 for a certain time, and performs operation S38 that determines whether the voltage of the battery cell 110 exceeds the first voltage through the voltage sensing unit 150. When the voltage of the battery cell 110 exceeds about 3.0 V as the determined result, the control unit 170 performs operation S32. However, when the voltage of the battery cell 110 still is equal to or lower than about 3.0 V as the determined result, the control unit 170 determines that a slight short occurs in the battery cell 110 or the battery cell 110 has been completely discharged, and stops the charge of the battery cell 110. Furthermore, the control unit 170 stops the output of the control signal M1g in the end of pre-charge operation S37, thereby allowing the operation of the pre-charge unit 130 to be stopped.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

DESCRIPTION OF REFERENCE NUMERALS

100; battery pack having booting charge function according to an embodiment
110; battery cell
120; current amplifying unit
121; noise filter
130; pre-charge unit
140; pulse charge unit
150; voltage sensing unit
160; temperature sensing unit
170; control unit
P+; pack positive terminal
P−; pack negative terminal
B+; cell positive terminal
B−; cell negative terminal
190; charger

What is claimed is:
1. A method of charging a battery pack, the battery pack comprising at least one battery cell, the method comprising:
comparing a battery cell voltage to a first voltage;

comparing the battery cell voltage to a second voltage that is greater than the first voltage; and controlling a current amplifying unit coupled to the at least one battery cell to amplify a current from a charger to the at least one battery cell if the battery cell voltage is between the first voltage and the second voltage, wherein the current amplifying unit comprises:

a first transistor and a second transistor each comprising a control electrode, a first electrode and a second electrode, wherein the first electrode of the first transistor is coupled to a ground reference, the first electrode of the second transistor is coupled to the charger, and the second electrode of the second transistor is coupled to the at least one battery cell; and a capacitor coupled between the control electrode of the first transistor and the second electrode of the first transistor, wherein controlling the current amplifying unit coupled to the at least one battery cell to amplify the current from the charger to the at least one battery cell if the battery cell voltage is between the first voltage and the second voltage comprises applying a control signal to the control electrode of the first transistor.

2. The method of claim 1, wherein in comparing the battery cell voltage, the first voltage is between about 3.0 V and about 4.2 V and wherein the second voltage is between about 4.1 V and about 4.25 V.

3. The method of claim 1, wherein increasing the current comprises increasing the current by between about 110% and about 130%.

4. The method of claim 1, wherein controlling the current amplifying unit comprises providing the control signal from a control unit to the current amplifying unit.

5. The method of claim 1, further comprising determining whether a temperature of the at least one battery cell exceeds a reference temperature and terminating charging of the at least one battery cell if the temperature of the at least one battery cell exceeds the reference temperature.

6. The method of claim 1, further comprising pulse-charging the at least one battery cell if the battery cell voltage is greater than the second voltage.

7. The method of claim 6, wherein pulse-charging the at least one battery cell comprises converting a voltage from the charger to a pulse-type voltage and supplying the pulse-type voltage to the at least one battery cell.

8. The method of claim 1, further comprising pre-charging the at least one battery cell if the voltage of the at least one battery cell is less than the first voltage.

9. A battery pack comprising:
at least one battery cell;
a current amplifying unit coupled to the at least one battery cell and configured to amplify a current from a charger to the at least one battery cell, wherein the current amplifying unit comprises:
a first transistor and a second transistor each comprising a control electrode, a first electrode and a second electrode, wherein the first electrode of the first transistor is coupled to a ground reference, the first electrode of the second transistor is coupled to the charger, and the second electrode of the second transistor is coupled to the at least one battery cell, and
a capacitor coupled between the control electrode of the first transistor and the second electrode of the first transistor; and
a control unit configured to apply a control signal to the control electrode of the first transistor in accordance with a voltage of the at least one battery cell for the current amplifying unit to amplify the current from the charger to the at least one battery cell if the voltage of the at least one battery cell is between a first voltage and a second voltage greater than the first voltage.

10. The battery back of claim 9, further comprising a pulse charge unit coupled to the at least one battery cell and configured to convert a voltage from the charger into a pulse-type voltage.

11. The battery pack of claim 9, further comprising a pre-charge unit for pre-charging the at least one battery cell.

12. The battery pack of claim 9, further comprising a voltage sensing unit for sensing the voltage of the at least one battery cell and a temperature sensing unit for sensing a temperature of the at least one battery cell.

13. The battery pack of claim 9, wherein the current amplifying unit is configured to amplify the current supplied to the at least one battery cell by between about 110% and about 130%.

14. The battery pack of claim 9, wherein the current amplifying unit is configured to operate when the voltage of the at least one battery cell is at a first voltage and wherein the pulse charge unit is configured to operate when the voltage of the at least one battery cell is at a second voltage that is higher than the first voltage.

15. The battery pack of claim 14, wherein the first voltage is between about 3.0 V and about 4.2 V and wherein the second voltage is between about 4.1 V and about 4.25 V.

16. The battery pack of claim 9, wherein the current amplifying unit further comprises a noise filter.

17. A battery pack comprising:
at least one battery cell; and
a current amplifying unit coupled to the at least one battery cell and configured to amplify a current from a charger to the at least one battery cell, wherein the current amplifying unit comprises:
a first transistor and a second transistor each comprising a first electrode, a second electrode, and a control electrode, wherein the first transistor and the second transistor are coupled in series between the charger and the at least one battery cell; and
a voltage regulator comprising an input terminal coupled to the second electrode of the first transistor and an output terminal coupled to the control electrode of the second transistor.

18. A battery pack comprising:
at least one battery cell; and
a current amplifying unit coupled to the at least one battery cell and configured to amplify a current from a charger to the at least one battery cell, wherein the current amplifying unit comprises:
a first transistor and a second transistor each comprising a first electrode, a second electrode, and a control electrode, wherein the first transistor and the second transistor are coupled in series between and the at least one battery cell; and
a voltage regulator comprising an input terminal coupled to the control electrode of the second transistor and an output terminal coupled to the second electrode of the second transistor.

* * * * *